United States Patent
Lee et al.

(10) Patent No.: US 9,972,448 B2
(45) Date of Patent: May 15, 2018

(54) SUPERCAPACITOR ELECTRODE MATERIAL HAVING COMBINED POROUS TITANIUM OXIDE AND CARBON-BASED MATERIAL, AND METHOD FOR MANUFACTURING SAME

(71) Applicant: SAMSUNG SDI CO., LTD., Yongin-si, Gyeonggi-do (KR)

(72) Inventors: Jin Hee Lee, Chungcheongnam-do (KR); Hyun Cheol Lee, Daejeon (KR); Sang Mi Kim, Incheon (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 340 days.

(21) Appl. No.: 14/431,112

(22) PCT Filed: Sep. 30, 2013

(86) PCT No.: PCT/KR2013/008739
§ 371 (c)(1),
(2) Date: Mar. 25, 2015

(87) PCT Pub. No.: WO2014/092313
PCT Pub. Date: Jun. 19, 2014

(65) Prior Publication Data
US 2015/0262763 A1    Sep. 17, 2015

(30) Foreign Application Priority Data
Dec. 12, 2012    (KR) .................. 10-2012-0144745

(51) Int. Cl.
*H01G 9/00*    (2006.01)
*H01M 4/02*    (2006.01)
(Continued)

(52) U.S. Cl.
CPC ............. *H01G 11/46* (2013.01); *H01G 11/26* (2013.01); *H01G 11/32* (2013.01); *H01G 11/36* (2013.01); *H01G 11/86* (2013.01); *Y02E 60/13* (2013.01)

(58) Field of Classification Search
CPC ................................ H01G 11/46; H01G 11/36
(Continued)

(56) References Cited

U.S. PATENT DOCUMENTS

2005/0155216 A1    7/2005    Cho et al.
2008/0170982 A1    7/2008    Zhang et al.
(Continued)

FOREIGN PATENT DOCUMENTS

JP    2002-158140 A    5/2002
JP    2005-203365 A    7/2005
(Continued)

OTHER PUBLICATIONS

Extended European Search Report dated Aug. 9, 2016 in Corresponding European Patent Application No. 13862039.8.
(Continued)

*Primary Examiner* — Eric Thomas
*Assistant Examiner* — Arun Ramaswamy
(74) *Attorney, Agent, or Firm* — Lee & Morse, P.C.

(57) ABSTRACT

The present invention relates to a supercapacitor electrode material in which a transition metal oxide and a carbon-based material are combined, and particularly, to a supercapacitor electrode material which increases) the capacitance of a capacitor by increasing a specific surface area through the process of making pores of a transition metal oxide and then applying the transition metal oxide having the increased specific surface area, and to a method for manufacturing the supercapacitor electrode material. According to the present invention, the supercapacitor elec-
(Continued)

trode material is manufactured by mixing and reacting a layered titanium oxide with a spherical titanium oxide to obtain a porous titanium oxide, and combining the porous titanium oxide with a carbon-based material.

10 Claims, 2 Drawing Sheets

(51) Int. Cl.
*H01M 4/13* (2010.01)
*H01G 11/36* (2013.01)
*H01G 11/46* (2013.01)
*H01G 11/32* (2013.01)
*H01G 11/86* (2013.01)
*H01G 11/26* (2013.01)

(58) Field of Classification Search
USPC .............................. 361/502; 429/231.5, 209
See application file for complete search history.

(56) References Cited

U.S. PATENT DOCUMENTS

| | | |
|---|---|---|
| 2010/0117033 A1 | 1/2010 | Seele et al. |
| 2010/0243968 A1 | 9/2010 | Taniguchi et al. |
| 2012/0077006 A1* | 3/2012 | Worsley .................. C04B 35/83 428/219 |

FOREIGN PATENT DOCUMENTS

| | | |
|---|---|---|
| JP | 2012-197187 A | 10/2012 |
| KR | 10-0879767 B1 | 1/2009 |
| KR | 10-2012-0080026 A | 7/2012 |

OTHER PUBLICATIONS

International Search Report issued in PCT/KR2013/008739 dated Jan. 28, 2014 (4 pages).

An, et al., SnO$_2$/carbon nanotube nanocomposites synthesized in supercritical fluids: highly efficient materials for use as a chemical sensor and as the anode of a lithium-ion battery, Nanotechnology 18, 2007.

Li, et al., Aligned Heterostructures of Single-Crystalline Tin Nanowires Encapsulated in Amorphous Carbon Nanotubes, J. Phys. Chem. C 2007, 111, 9130-9135.

Park, et al., Nanostructured SnSb/Carbon Nanotube Composites Synthesized by Reductive Precipitation for Lithium-Ion Batteries, Chemical Materials 2007, 19, 2406-2410.

Wang, et al., Highly Reversible Lithium Storage in Porous SnO$_2$ Nanotubes with Coaxially Grown Carbon Nanotube Overlayers, Advance Materials 2006, 18, 645-649.

1$^{st}$ Office Action issued by the Japanese Patent Office dated Aug. 21, 2017 in the examination of the Japanese Patent Application No. 2015-547834; Jin Hee Lee, et al.

* cited by examiner

[FIG. 1]
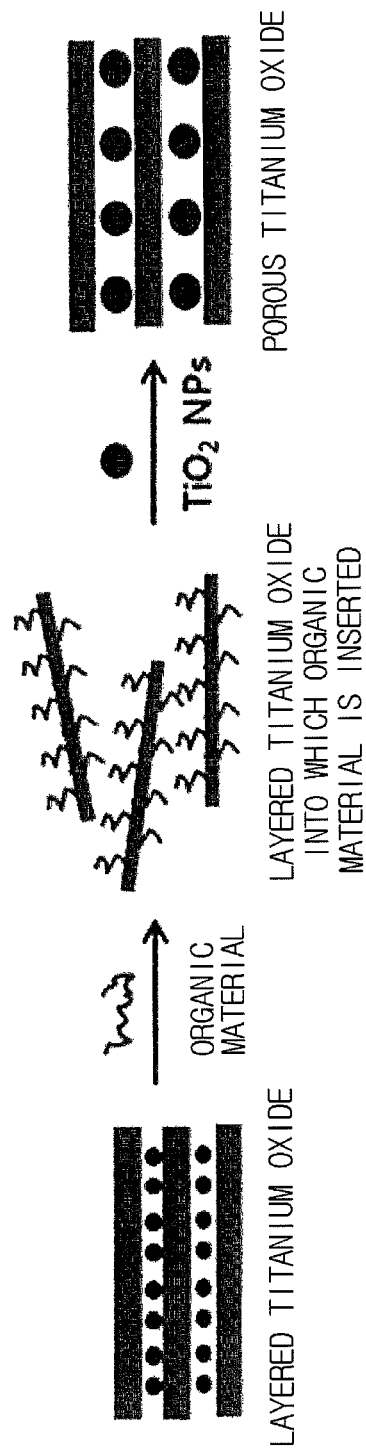

[FIG. 2]
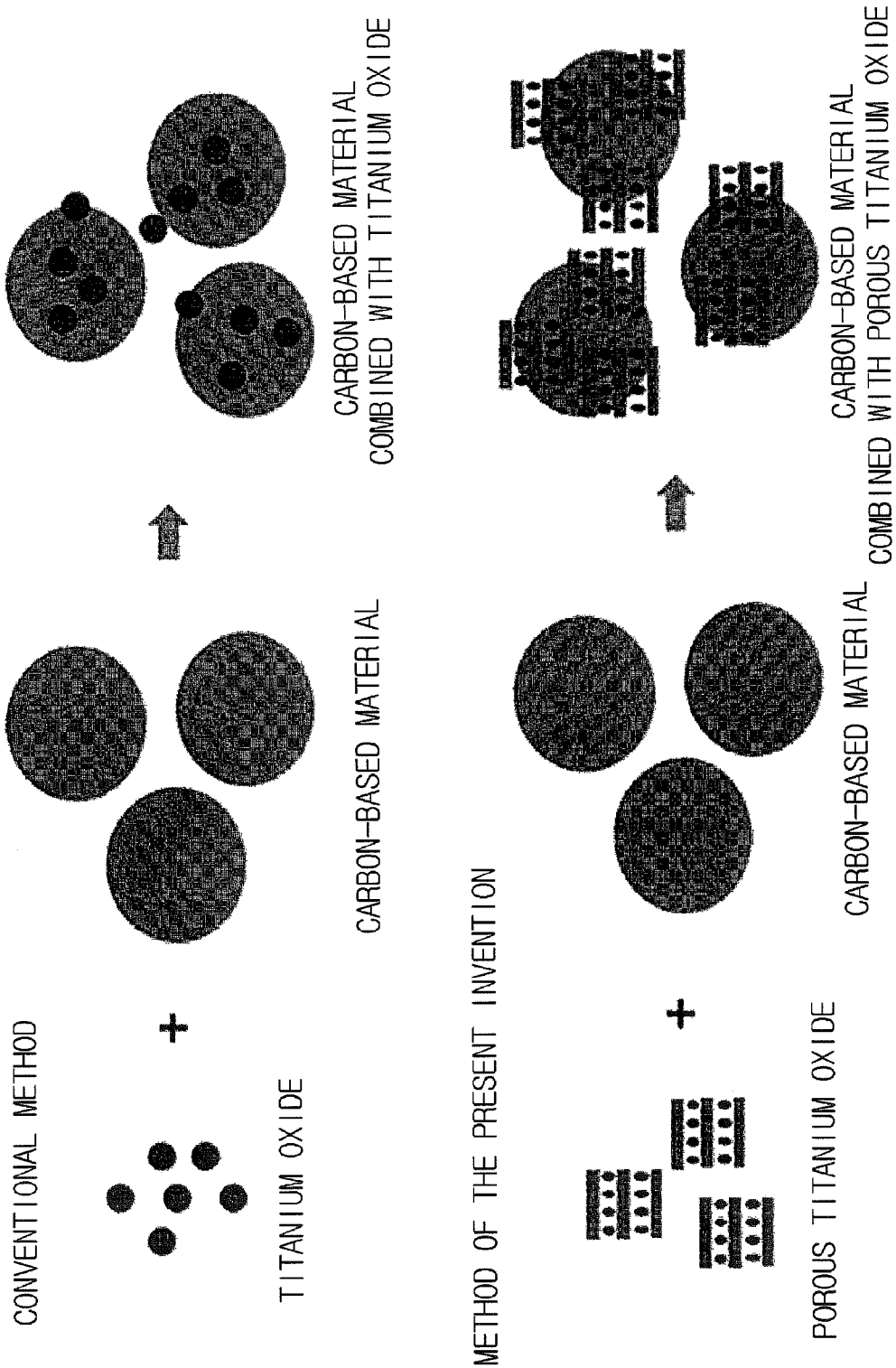

SUPERCAPACITOR ELECTRODE MATERIAL HAVING COMBINED POROUS TITANIUM OXIDE AND CARBON-BASED MATERIAL, AND METHOD FOR MANUFACTURING SAME

TECHNICAL FIELD

The present invention relates to an energy storage-type capacitor (supercapacitor), and particularly, to a capacitor electrode material using a material which is suitable for implementing a high energy density, and to a method for manufacturing the supercapacitor.

BACKGROUND ART

An energy storage-type capacitor is a capacitor having a mechanism which may store energy while serving as a conventional capacitor, and an energy storage device which may serve as a bridge between a battery and a capacitor. In terms of energy density and power density, an energy storage-type capacitor having intermediate characteristics of an electrolytic condenser and a secondary battery is a system which has a shorter charging time and a longer service life, and may achieve higher output than a secondary battery, and has a 10-times higher energy density than a conventional electrolytic condenser. In general, in the capacitor, a positive electrode and a negative electrode, which are manufactured by applying each of the electrode materials on each of the electrode current collectors, are coupled to each other, having a separator therebetween, and the capacitor configured of the positive electrode/the separator/the negative electrode is received in various gaskets and then an electrolytic solution is injected thereinto, thereby manufacturing a final capacitor. The energy storage-type capacitor is an energy storage device that converts chemical reaction into electrical energy using electrostatic orientation (electrochemical double layer) of ions at the interface between the electrode and the electrolyte and stores the electrical energy. The capacitance (C) value in the capacitor is proportional to a contact area, and is inversely proportional to a distance between positive charges and negative charges, that is, the thickness of a dielectric layer. In the energy storage-type capacitor, the area of the energy storage-type capacitor is dramatically increased by using a nano-scale porous carbon electrode material, and the capacitance value may be increased to have ultrahigh capacity by decreasing the thickness of the dielectric layer to become an ionic layer of 10 Å.

The supercapacitor is classified into an electrochemical double-layer capacitor which stores charges in an electrochemical double layer of an interface between an electrode and an electrolyte, and a redox capacitor, also referred to as a pseudo capacitor, which is accompanied by changes in an oxidation number (valance) of transition metal ions on the surface of a transition metal oxide and stores charges or electrons, according to the operating principle.

Even though the electrochemical double-layer capacitor has a theoretically wide specific surface area using activated carbon, the area, which may be calculated and used as the actual capacitance value, is only 20 to 30% of the total specific surface area. This difference is related to ion size in the electrolyte to be adhered to the inside of the activated carbon and adsorption degree specifically, porous activated carbon may be classified into three types, macroporous activated carbon (20 Å<), mesoporous activated carbon (20 Å<pore size<100 Å), and macroporous activated carbon (>100 Å) according to the pore size, and among them, when the pore size is a micropore, the pore size may not be a size suitable for ions in the electrolyte to enter the pores. Accordingly, a large number of micropores in the activated carbon result in decreasing the dramatically increased specific surface area that is an advantage of using activated carbon. Accordingly, a method which may increase the power density of an energy storage-type capacitor is to maintain a porous structure suitable for a predetermined size of the electrolyte ion. However, this method incurs high costs and loss of time due to heat treatment several times and additional processes.

Meanwhile, when a single-type transition metal oxide is used for a redox capacitor, the resulting redox capacitor greatly deteriorates in terms of prices and efficiency. For example, $RuO_2$ has proved to be currently best in terms of energy storage characteristics, but the prices are so high that $RuO_2$ has a disadvantage in that $RuO_2$ is not suitable for mass production, and a disadvantage in that the charging and discharging curve is non-linear in terms of efficiency. Accordingly, a material obtained in which a carbon-based material and a transition metal oxide are combined is used. For example, since carbon nano tube is advantageous in high electric conductivity and a wide specific surface area as a 1D-structure, but has a defect in that carbon nano tube shows a low unit volumetric capacity due to large voids, and a low theoretical capacity (372 mAh/g), which is the same as that of graphite, a result obtained by attaching a material such as $SnO_2$, Sn, and SnSb, which exhibits high capacity to carbon nano tube has been reported [Y. Wang et al., Adv. Mat. 18 (2006) 645; G. An et al., Nanotech. 18 (2007) 435707; R. Li et al., J. Phys. Chem. C 111 (2007) 9130; M. S. Park et al., Chem. Mater. 19 (2007) 2406].

However, a metal oxide adsorbed on a carbon-based material has a size of about 10 to 100 nm, and thus, has a disadvantage in that the entire specific surface area is limited to 10 to 100 $m^2/g$. Considering that a carbon-based material has a general specific surface area of 500 to 2,500 $m^2/g$, it can be known that a substantial active area (contact area) is limited by the specific surface area of a small metal oxide.

DISCLOSURE

Technical Problem

An object of the present invention is to provide a supercapacitor electrode material having capacity, which is increased two times as much as that of a conventional supercapacitor composed of a titanium oxide and a carbon-based material, by increasing the specific surface area of the oxide adsorbed on the carbon-based material to increase a substantial active area on the surface of the carbon-based material, and a method for manufacturing the same.

Technical Solution

The present invention provides a supercapacitor electrode material including a porous titanium oxide and a carbon-based material.

Preferably, the carbon-based material is included in a range of 10 to 800 parts by weight based on 100 parts by weight of the oxide.

Preferably, the porous titanium oxide is in a form in which a spherical titanium oxide is located between layers of a layered titanium oxide.

Preferably, the spherical titanium oxide in the porous titanium oxide is included in a range of 10 to 100 parts by weight based on 100 parts by weight of the layered titanium oxide.

Preferably, the spherical titanium oxide has a particle diameter in a range of 1 to 10 nm. Preferably, the carbon-based material is carbon nano tube (CNT).

The present invention provides a method for manufacturing a supercapacitor electrode material, the method including: inserting a macro organic material between layers of a layered titanium oxide to weaken interlaminar force; inserting a spherical titanium oxide between layers of the layered titanium oxide; performing a heat treatment to obtain a porous titanium oxide; and combining the titanium oxide with carbon nano tube.

Preferably, in order to weaken the interlaminar force of the layered titanium oxide, a macro organic material having a mole number, which is the same as that of hydrogen ions included in the layered titanium oxide, and the layered titanium oxide are introduced into distilled water and mixed.

Preferably, in order to insert a spherical titanium oxide between layers of the layered titanium oxide, the spherical titanium oxide in a range of 10 to 100 parts by weight is mixed with 100 parts by weight of the layered titanium oxide.

Preferably, the heat treatment is performed in a temperature range of 200 to 600° C. for 1 to 3 hours.

Preferably, in order to combine the titanium oxide with a carbon-based material, carbon nano tube in a range of 10 to 800 parts by weight is mixed with 100 parts by weight of the titanium oxide.

Advantageous Effects

In the present invention, a pore-making process may be performed on the titanium oxide to expand the specific surface area up to 250 m²/g and increase a substantial active area on the surface of the carbon-based material. Accordingly, when the supercapacitor electrode material of the present invention is used, it is possible to improve the capacity two times as much as the capacity of a conventional supercapacitor which uses an electrode material composed of a titanium transition metal oxide and a carbon-based material.

DESCRIPTION OF DRAWINGS

FIG. 1 illustrates a process of manufacturing a porous titanium oxide.

FIG. 2 illustrates a process of combining a titanium oxide with a carbon-based material.

BEST MODE

The present invention provides a supercapacitor electrode material including a titanium oxide with an expanded specific surface area due to a porous structure, and a carbon-based material.

The term "supercapacitor electrode material" used in the present invention corresponds to an electrode material in a lithium secondary battery, and refers to a material which is applied to a current collector and used as an electrode of a supercapacitor.

It is preferred that in combining the titanium oxide with the carbon-based material, the carbon-based material is used in a range of 10 to 800 parts by weight based on 100 parts by weight of the titanium oxide.

The supercapacitor electrode material allows ions to be electrostatically oriented at the interface between the electrode and the electrolyte of the capacitor. Therefore, an increase in specific surface area in this part leads to expanding the active area, in which a larger amount of ions may be electrostatically oriented, so as to increase the capacity of the capacitor.

In the present invention, the porous titanium oxide is in a form in which a spherical titanium oxide is located between layers of a layered titanium oxide, as illustrated in FIG. 1 as an example. This may be obtained in the following sequence.

First, a layered Cs-titanate (cesium titanium oxide) is synthesized by a solid-phase method. For this purpose, a cesium precursor such as $Cs_2CO_3$ (cesium carbonate) is mixed with a titanium oxide such as $TiO_2$ (titanium dioxide) to perform a heat treatment at a temperature of 700 to 800° C. for 15 to 20 hours.

Next, the synthesized material is reacted with an acid solution and modified into a layered H-titanate (a form in which cesium is removed by acid). H-titanate is in a form in which the cesium metal located between layers of the layered Cs-titanate is eliminated, and the modification is a process of obtaining a layered titanium oxide with empty interlayers from a layered Cs-titanate initially synthesized. For the reaction, a weak acid as an acid solution has a problem in that it takes too long for the reaction to be completed, so that a generally strong acid such as HCl and $H_2SO_4$ is used. Further, it is preferred that as the acid solution for completing the reaction, an acid solution having a concentration of 1 to 2 M is used. The reaction is performed by mixing the acid solution and the layered Cs-titanate in an amount sufficient to immerse the sample, and leaving the resulting mixture to stand. A layered H-titanate may be obtained by reacting the mixture for 3 to 5 days. It is preferred that the acid solution is replaced with a new acid solution during the reaction such that Cs may be completely converted into H. It may be identified by XRD whether Cs is converted into H.

The layered H-titanate thus obtained is reacted with a macro organic material in order to separate the interlayer of the layered H-titanate, or weaken the interlaminar force. The macro organic material may be used without limitation as long as the macro organic material is a positively charged organic material such as tetrabutyl ammonium bromide (TAB). Since titanate is negatively charged, it is possible to use one or more selected from positively charged organic materials as a macro organic material. Further, for an interlaminar separation reaction by a macro organic material, a macro organic material having a molar ratio, which is at least the same as that of hydrogen ions which may be exchanged with the layered H-titanate, and the layered H-titanate are dissolved together in distilled water and stirred to penetrate the macro organic material into the layers, thereby weakening force which maintains the interlayer.

Next, a porous titanium oxide, in which a spherical titanium oxide is located between layers of the layered titanium oxide, is manufactured by mixing the layered titanium oxide in which layers are separated (the interlaminar force is weakened) with the spherical titanium oxide, and performing heat treatment on the mixture. As the spherical titanium oxide, a spherical titanium oxide synthesized by a sol-gel reaction as an exemplary embodiment may be used, but the spherical titanium oxide is not limited thereto. In addition, it is preferred that as the spherical titanium oxide particle, nano-scale particles having a particle diameter in a range of 1 to 10 nm are used. When the particle diameter of particles is less than the range, it is not possible to obtain a level which is satisfactory in terms of an effect of enhancing the specific surface area due to the porous structure, and when particles having the particle diameter exceeding the range are used, gaps between layers are so widened that a structure of a capacitor material in a stabilized form may not be obtained. Furthermore, as the mixture ratio of the layered titanium oxide and the spherical titanium oxide, the spherical titanium oxide is included in a range of 10 to 100 parts by weight based on 100 parts by weight of the layered titanium oxide.

This is also because the range is the most appropriate mixture ratio in consideration of both an effect of enhancing a specific surface area by the porous structure and a capacitor electrode material structure in a stabilized form. The heat treatment is a process for removing the macro organic material, and is performed in a temperature range of 200 to 600° C. for 1 to 3 hours.

The porous titanium oxide thus obtained is combined with a carbon-based material, as illustrated in FIG. 2, to obtain the supercapacitor electrode material of the present invention. As an example of the carbon-based material, carbon nano tube (CNT) may be used.

For combining the titanium oxide with the carbon-based material, the carbon-based material in an amount of 10 to 800 parts by weight is physically mixed with the titanium oxide by using a mortar and the like, and then is stirred with N-methyl-2-pyrrolidone (NMP) or the like, which is used as a solvent, for 6 to 8 hours for mixture. Next, the supercapacitor electrode material of the present invention is finally obtained by drying the material obtained in an oven at a temperature of 110 to 150° C.

The supercapacitor electrode material obtained is a product obtained by combining the titanium oxide, in which the specific surface area is expanded through the process of making pores, with the carbon-based material, and thus increases the entire specific surface area compared to the conventional carbon-based material combined with titanium oxide that is together illustrated in FIG. 2. Accordingly, a supercapacitor manufactured by inserting the electrode material of the present invention into both electrodes of a capacitor and applying the electrode material to the electrodes significantly increases a capacitor which is limited by a small specific surface area of the oxide.

Example

1) Preparation of Porous Titanium Oxide $Cs_2CO_3$ (cesium carbonate) and $TiO_2$ (titanium dioxide) were stoichiometrically mixed and a heat treatment was performed at 800° C. for 20 hours in order to prepare a layered Cs-titanate (cesium titanium oxide) represented by Chemical Formula $Cs_{0.67}Ti_{1.83}\square_{0.17}O_4$ (here, $\square$ means a vacancy which is responsible for the negative charge in the electrode material layer). Next, the synthesized material was mixed in an amount sufficient to be immersed in a 1 M HCl solution, and left to stand for 3 days for reaction. In this case, the acid solution was replaced with a new acid solution once a day.

A sample substituted with the acid obtained by the process was centrifuged, and then dried to obtain a powder, and a product obtained and tetrabutyl ammonium bromide (TBA) present in the molecular formula in an H amount were together put into distilled water and the mixture was reacted, thereby obtaining a layered titanium oxide solution in which the interlaminar force is weakened.

And then, 30 mL of titanium isopropoxide and 20.38 mL of acetyl acetone were mixed, the mixture was put into 180 mL of a 0.015 M nitric acid aqueous solution, vigorously stirred, and reacted at 60° C. for 8 hours, thereby preparing a colloidal solution (titanium oxide nanozol) of a spherical titanium oxide on a nano scale. Here, the layered titanium oxide solution was added to the spherical titanium oxide and the mixture was stirred and mixed at 60° C. for 24 hours, thereby forming a porous titanium oxide. A powder was obtained by centrifuging the prepared solution at 12,000 rpm for 10 minutes. And then, in order to remove an organic material (TBA) from the obtained porous titanium sample, the sample was washed with a solution obtained by mixing distilled water and ethanol (a volume ratio of 1:1), and finally, a heat treatment was performed at 300° C. for 2 hours, thereby preparing a porous titanium oxide.

2) Combination of Porous Titanium Oxide and Carbon Nano Tube

The titanium oxide obtained by the process and carbon nano tube were prepared at a mass ratio of 8:1 and physically mixed by using a mortar, and 3 mL of N-methyl pyrrolidone (NMP) as a solvent was introduced thereinto, and then the mixture was stirred. Furthermore, the mixture was dried in an oven at 110° C. or more, thereby preparing a supercapacitor electrode material.

Comparative Example

A generally commercially available titanium oxide ($TiO_2$, Sigma Aladrich) and carbon nano tube were prepared at a mass ratio of 8:1 and physically mixed by using a mortar, and 3 mL of N-methyl pyrrolidone (NMP) as a solvent was introduced thereinto, and then the mixture was stirred. Furthermore, the mixture was dried in an oven at 110° C. or more, thereby preparing a supercapacitor electrode material.

Evaluation

The supercapacitor electrode material prepared in the Example and the Comparative Example, a binder polyvinylidene fluoride (PVDF) and a conductive material were introduced at a mass ratio of 8:1:1, and the mixture was stirred. A working electrode was manufactured by thinly coating the solution obtained on an aluminum foil, and a stainless steel foil was used as a counter electrode and a reference electrode. And then, cyclic voltammetry (CV) was used to measure the capacity in a range of 0 V to 2.8 V at a scan rate of 100 mV/s.

As a result, it could be confirmed that in the case of the Comparative Example, the capacity was about 120 F/g, whereas in the case of the Example, the capacity was increased about 2 times more, which is about 220 F/g.

The invention claimed is:

1. A supercapacitor electrode material comprising:
   a porous titanium oxide, the porous titanium oxide being in a form in which a spherical titanium oxide is between layers of a layered titanium oxide; and
   a carbon-based material.

2. The supercapacitor electrode material of claim 1, wherein the carbon-based material is comprised in a range of 10 to 800 parts by weight based on 100 parts by weight of the porous titanium oxide.

3. The supercapacitor electrode material of claim 1, wherein the spherical titanium oxide in the porous titanium oxide is comprised in a range of 10 to 100 parts by weight based on 100 parts by weight of the layered titanium oxide.

4. The supercapacitor electrode material of claim 1, wherein the spherical titanium oxide has a particle diameter in a range of 1 to 10 nm.

5. The supercapacitor electrode material of claim 1, wherein the carbon-based material is carbon nano tube (CNT).

6. A method for manufacturing a supercapacitor electrode material, the method comprising:
- inserting a macro organic material between layers of a layered titanium oxide to weaken interlaminar force;
- inserting a spherical titanium oxide between the layers of the layered titanium oxide;
- performing a heat treatment on the spherical titanium oxide with the layered titanium oxide to obtain a porous titanium oxide; and
- combining the porous titanium oxide, which is in a form in which the spherical titanium oxide is between the layers of the layered titanium oxide, with a carbon-based material to form the supercapacitor electrode material.

7. The method of claim 6, wherein in order to weaken the interlaminar force of the layered titanium oxide, a macro organic material having a mole number, which is the same as that of hydrogen ions comprised in the layered titanium oxide, and the layered titanium oxide are introduced into distilled water and mixed.

8. The method of claim 6, wherein in order to insert the spherical titanium oxide between the layers of the layered titanium oxide, a spherical titanium oxide in a range of 10 to 100 parts by weight is mixed with 100 parts by weight of the layered titanium oxide.

9. The method of claim 6, wherein the heat treatment is performed in a temperature range of 200 to 600° C. for 1 to 3 hours.

10. The method of claim 6, wherein in order to combine the porous titanium oxide with the carbon-based material, a carbon-based material in a range of 10 to 800 parts by weight is mixed with 100 parts by weight of the porous titanium oxide.

* * * * *